United States Patent [19]

Hosseini et al.

[11] Patent Number: 5,893,294
[45] Date of Patent: Apr. 13, 1999

[54] CONTROL FOR HIGH SPEED DIRECTIONAL SHIFT

[75] Inventors: Javad Hosseini, Edelstein; David L. Dickrell, Dunlap, both of Ill.

[73] Assignee: Caterpillar Inc., Peoria, Ill.

[21] Appl. No.: 08/769,261

[22] Filed: Dec. 18, 1996

[51] Int. Cl.$^6$ .................................. F16H 59/04
[52] U.S. Cl. .......................... 74/336 R; 74/335
[58] Field of Search ................... 74/335, 336 R; 477/124, 122, 906

[56] References Cited

U.S. PATENT DOCUMENTS

| | | | |
|---|---|---|---|
| 4,768,636 | 9/1988 | Ito et al. ............................. | 477/71 |
| 4,991,455 | 2/1991 | Bulgrien ............................. | 74/336 R |
| 5,305,657 | 4/1994 | Bray et al. ........................... | 74/336 R |
| 5,353,662 | 10/1994 | Vaughters ........................... | 74/336 R |
| 5,587,905 | 12/1996 | Yesel et al. ........................ | 74/336 R X |
| 5,636,120 | 6/1997 | Yesel et al. ........................ | 74/335 X |

*Primary Examiner*—Charles A. Marmor
*Assistant Examiner*—William C. Joyce
*Attorney, Agent, or Firm*—Calvin E. Glastetter

[57] ABSTRACT

A method for controlling automatically controlling the shifting of a transmission when operating the higher speeds so that a downshift is performed before a directional shift is made. A controller receives a directional signal, a mode signal, a transmission output speed signal. The signals and a shift sequence table is used to shift the transmission when the machine has reached an "on speed" point. The controller will perform a shift after a predetermined time without the machine reaching the "on speed" point.

4 Claims, 2 Drawing Sheets

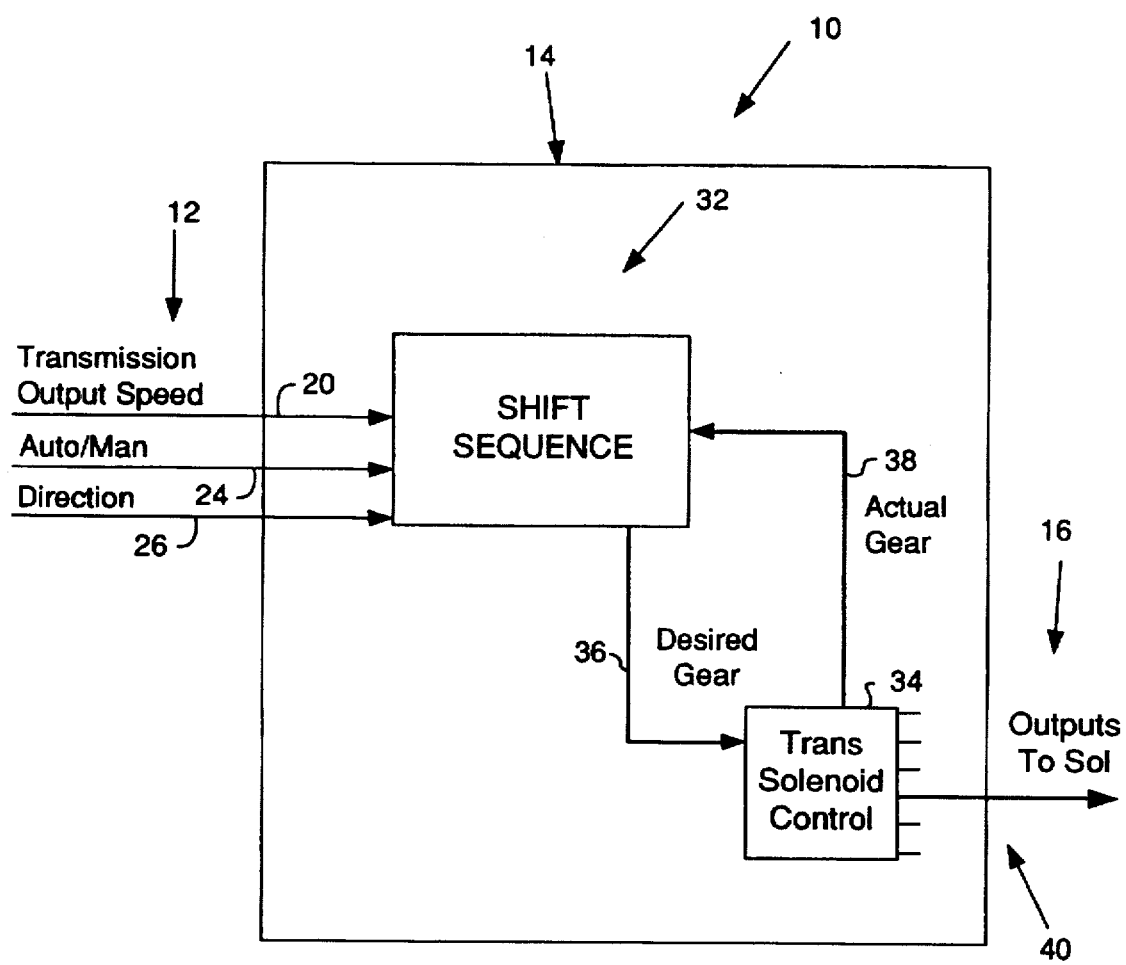
Fig_1_

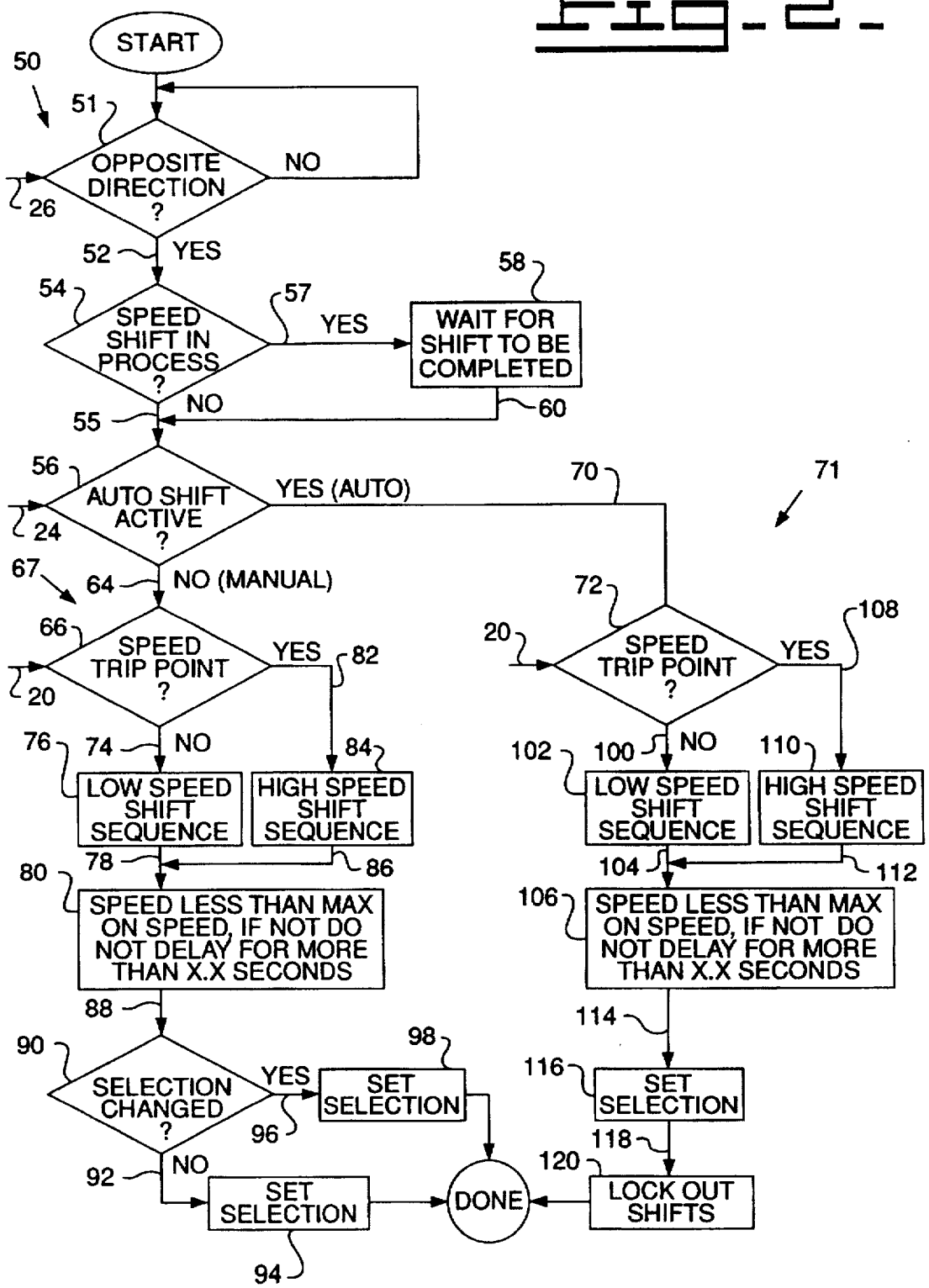
Fig_2_

CONTROL FOR HIGH SPEED DIRECTIONAL SHIFT

TECHNICAL FIELD

This invention relates generally to a control for shifting a transmission and more particularly to a method for shifting the transmission during a high speed directional shift.

BACKGROUND ART

A control system is usually provided for shifting the transmission of a machine. The control is set to automatically upshift or downshift the transmission at a predetermined machine speed and also performs a directional shift when such a change is required by the operator. One of the problems associated with such an automatic system is that performing a directional shift from a speed range in one direction to a the same speed range in the opposite direction at higher speeds could result in the operator feeling a jerk or jolt and the machine transmission could be damaged.

The present invention is directed to overcoming one or more of the problems as set forth above.

DISCLOSURE OF THE INVENTION

In one aspect of the present invention a method of controlling a transmission shift sequence includes the steps of sensing a directional shift to determine if the direction has changed from the current direction and sending a signal indicating the direction to a shift strategy controller, sensing a mode selection signal to determine if the automatic shift mode is active and sending a signal indicating that the automatic shift mode is active or inactive, sensing a transmission output speed signal for determining if the speed is above a predetermined high speed trip point, and shifting the transmission according to the sensed signals so that when a high speed directional shift is made a downshift will be performed before the directional shift is made.

The present invention provides a method for shifting the transmission when the machine is above a predetermined high speed trip point. The controller will sense the transmission output speed and perform a downshift before the directional shift is performed so that smoother shifts are provided and to prolong the life of the transmission.

BRIEF DESCRIPTION OF THE DRAWINGS

FIG. 1 is a block diagram of the controller apparatus for controlling the operation of the control system of the present invention.

FIG. 2 shows a flow chart depicting the logical steps carried out for determining the sequence for performing a shift.

BEST MODE FOR CARRYING OUT THE INVENTION

Referring to FIG. 1, the control system 10 includes an input section, a controller such as a microprocessor 14 and a output section 16. The control system 10 is adapted to be used on a machine having an engine, a transmission having a torque converter (not shown) to control the shiftpoints of the transmission.

The input section includes a transmission output speed signal 20, a mode signal 24 indicating if the control system is to operate in a manual mode or automatic mode, a directional signal 26 indicating whether the machine is operating in the forward or reverse direction.

The controller 14 includes a shift sequence module 32 and a transmission solenoid control module 34. The shift sequence module 32 receives the input signals 20,24,26 and controls the shifting of the transmission relative to the received signals. A signal 36 is sent from the shift sequence module 32 to the transmission solenoid control module 34 to indicate the desired gear. The transmission solenoid control module 34 sends a signal 38 to the shift sequence module to indicate the actual gear of the transmission. The shift sequence module 32 uses lookup tables and associated logic (to be described later) to control the shifting of the transmission.

The output section 16 includes a plurality of signals 40 which are sent from the transmission solenoid control module 34 to solenoids (not shown) of the transmission for controlling the shift sequence of the transmission.

Referring to FIG. 2, a method and control system 50 for controlling the shifting of a transmission of a machine, not shown, is disclosed. In block 51 when the operator selects a machine and transmission direction the direction signal 26 is sensed and compared to the current direction to determine if the selected direction is opposite the current direction. If the direction is not changed the signal is looped back to the start. If the direction has changed a signal 52 is sent to a block 54. In block 54 it is determined if a speed shift is in process. If a speed shift is not in process a signal 55 is sent to a block 56. If a speed shift is in process a signal 57 is sent to a block 58. In block 58 the shift is monitored to determine if the speed shift has been completed and the clutch is locked up. After the shift is completed a signal 60 is sent to the block 56. In block 56 the auto/manual signal 24 is sensed to determined if the automatic shift mode is active. If the automatic shift mode is not active a signal 64 is sent to a block 66 in the manual mode branch 67 of the control system 50. If the automatic shift mode is active a signal 70 is sent to a block 72 in the automatic mode branch 71 of the control system 50. In block 66 the transmission output speed signal 20 is monitored to determine if the output speed is above the manual mode high speed trip point. The trip point is a predetermined value which is based on the type of machine and the actual gear of the transmission. For example, in this embodiment low speed is less than or equal to 7 MPH. If the output speed is not above the manual mode high speed trip point a signal 74 is sent to a block 76. In block 76 the manual mode low speed shift sequence table for the actual gear is loaded and a signal 78 indicating the shift sequence is sent to a block 80. If the output speed is above the manual mode high speed trip point a signal 82 is sent to a block 84. In block 84 the manual mode high speed shift sequence table for the actual gear is loaded and a signal 86 indicating the shift sequence is also sent to the block 80. In block 80 the shifts are executed as specified in the shift table as indicated by the signals 78,86. In block 80 it is monitored so that each shift is completed before doing the next shift. If the shift is in the same direction as the start of the shift direction, then wait for the output speed to be less than the maximum "on speed" for the actual gear before going to the next shift. The "on speed" setting is a predetermined value based on the type of machine and the actual gear of the transmission. For example, in this embodiment "on speed" for second gear is approximately 9 MPH and "on speed" for third gear is approximately 16 MPH. The shift should not be delayed for more than a predetermined time even though the machine has not achieved the predetermined "on speed" value. For example, do not delay more than 1.0 second. After all functions have been performed in block 80 a signal 88 is sent to a block 90. In block 90 it is determined if the operator has changed the speed selection since the beginning of the directional shift. If the speed selection has not changed a signal 92 is sent to a block 94. In block 94 the desired speed selection is set to equal the last speed selection from the directional shift. If the speed selection has changed a signal 96 is sent to a block 98. In block 98 the desired speed selection is set to equal the desired operator speed selection.

In block 72 the transmission output speed signal 20 is monitored to determine if the output speed is above the automatic mode high speed trip point. The trip point is a predetermined value which is based on the type of machine and the actual gear of the transmission. If the speed is not above automatic mode high speed trip point a signal 100 is sent to a block 102. In block 102 the automatic mode low speed shift sequence table for the actual gear is loaded and a signal 104 indicating the shift sequence is sent to a block 106. If the output speed is above the automatic mode high speed trip point a signal 108 is sent to a block 110. In block 110 the automatic mode high speed shift sequence table for the actual gear is loaded and a signal 112 indicating the shift sequence is also sent to the block 106. In block 106 the shifts are executed as specified in the shift table as indicated by the signals 104,112. In block 106 it is monitored so that each shift is completed before doing the next shift. If the shift is in the same direction as the start of the shift direction, then wait for the output speed to be less than the maximum "on speed" for the actual gear before going to the next shift. The "on speed" setting is a predetermined value based on the type of machine and the actual gear of the transmission. The shift should not be delayed for more than a predetermined time even though the machine has not achieved the predetermined "on speed" value. For example, do not delay more than 1.0 second. After all functions have been performed in block 106 a signal 114 is sent to a block 116. In block 116 the desired speed selection is set to equal the last speed selection from the direction shift sequence and a signal 118 is sent to a block 120. In block 80 automatic upshifts are locked out for one second after a direction shift and automatic downshifts are locked out for three seconds after a direction shift.

In performing the strategy necessary to for shifting it is required see if it is a manual mode shift or an automatic mode shift, a low speed shift which is less than or equal to 7 MPH or a high speed shift which is above 7 MPH. When a high speed directional shift is made a downshift will be made before the directional shift is made. It is also checking if the speed has changed to reach the "on speed" setting which is 9 MPH in second gear and 16 MPH in third gear. The next shift will not be made until the predetermined "on speed" setting has been reached. However, the shift will be performed after a predetermined delay, 1.0 seconds, even if the "on speed" setting is not achieved within the predetermined time.

INDUSTRIAL APPLICABILITY

With reference to the drawings and in operation, the present invention is adapted to controllably shift a transmission of a machine. The control will perform the proper sequence of shifting and when the machine is operating in a higher speed the controller will perform a down shift and allow the machine to achieve an "on speed" point before a directional shift is made and if the machine speed does not achieve the speed before the predetermined time interval the controller will make the directional shift without achieving the speed point. An operator identifies a desired direction of movement as indicated by the signal 26 which is sent to the shift sequence module 32. A signal 24 indicating the automatic or manual mode is also sent to the shift sequence module 32. The transmission output speed signal 20 is also sent to the shift sequence module 32. The signals 20,24,26 and shift sequence tables 76,84,102,110 are used by the controller 14 to determine the proper shift sequence. When in the higher speeds the controller will monitor the transmission output speed to determine when the machine has reached "on speed" point and downshift the transmission before a directional shift is performed. The controller will also cause a shift to be performed after a predetermined time interval even if the machine has not reached the "on speed" point.

In view of the forgoing, the control system will perform a high speed directional shift that is smoother and avoid jerks or jolts and improve transmission life.

Other aspects, objects and advantages of this invention can be obtained from a study of the drawings, the disclosure and the appended claims.

We claim:

1. A method of controlling a transmission shift sequence including the steps of:

sensing a directional shift to determine if a change in direction has occurred and sending a signal indicating the direction to a shift strategy controller;

sensing a mode selection signal to determine if an automatic mode is active and sending a signal indicating that the automatic mode is active or inactive;

sensing a transmission output speed signal for determining if the speed is above a predetermined high speed trip point, sensing the transmission output speed to determine if a predetermined "on speed" point has been reached and shifting the direction of the transmission when the "on speed" trip point is reached and shifting the direction of the transmission even if the predetermined "on speed" point is not reached within a predetermined time interval;

and shifting the transmission according to the sensed signals so that when the shift strategy controller senses a directional shift above the predetermined high speed trip point a downshift will be made before the directional shift of the transmission.

2. A method, as set forth in claim 1, including the steps of:

shifting the transmission according to the sensed signals so that a downshift is made before the directional shift is performed when the speed is above the predetermined high speed trip point.

3. A method of controlling a transmission shift sequence including the steps of:

sensing a directional shift to determine if a change in direction has occurred and sending a signal indicating the direction to a shift strategy controller;

sensing a mode selection signal to determine if an automatic mode is active and sending a signal indicating that the automatic mode is active or inactive;

sensing a transmission output speed signal for determining if a predetermined "on speed" point has been reached and shifting the direction of the transmission when the predetermined "on speed" point is reached, sensing the transmission output speed to determine if the speed is less than the predetermined "on speed"

point and shifting the direction of the transmission even if the predetermined "on speed" point is not reached within a predetermined time interval; and shifting the transmission according to the sensed signals to that when the shift strategy controller senses a directional shift above the predetermined high speed trip point a downshift will be made before the directional shift of the transmission.

4. A method, as set forth in claim 3, including the step of: shifting the transmission according to the sensed signals so that a downshift is made before the directional shift is performed.

* * * * *